US009597757B2

(12) United States Patent
Pesenti et al.

(10) Patent No.: US 9,597,757 B2
(45) Date of Patent: Mar. 21, 2017

(54) APPARATUS FOR THE LIGHTENING OF PANELS OR THIN PLATES BY REMOVAL OF MATERIAL

(75) Inventors: Gino Pesenti, Zogno (IT); Pietro Aceti, Zogno (IT)

(73) Assignee: C.M.S. S.P.A., Zongo (BG) (IT)

( * ) Notice: Subject to any disclaimer, the term of this patent is extended or adjusted under 35 U.S.C. 154(b) by 993 days.

(21) Appl. No.: 13/883,546

(22) PCT Filed: Nov. 4, 2011

(86) PCT No.: PCT/IB2011/054922
§ 371 (c)(1),
(2), (4) Date: May 3, 2013

(87) PCT Pub. No.: WO2012/059891
PCT Pub. Date: May 10, 2012

(65) Prior Publication Data
US 2013/0245802 A1    Sep. 19, 2013

(30) Foreign Application Priority Data
Nov. 5, 2010 (IT) .............................. BS2010A0176

(51) Int. Cl.
*B23Q 1/03* (2006.01)
*G05B 19/401* (2006.01)
(Continued)

(52) U.S. Cl.
CPC ............. *B23Q 1/037* (2013.01); *B23Q 1/035* (2013.01); *B23Q 1/76* (2013.01); *B23Q 1/766* (2013.01);
(Continued)

(58) Field of Classification Search
None
See application file for complete search history.

(56) References Cited

U.S. PATENT DOCUMENTS 5,121,907 A * 6/1992 Engwall .................. B25B 11/00
269/131
6,775,897 B2    8/2004 Wolf et al.
(Continued)

FOREIGN PATENT DOCUMENTS

EP    0507033 A1    10/1992
EP    1223002 A2    7/2002
(Continued)

*Primary Examiner* — Qing Wu
(74) *Attorney, Agent, or Firm* — Volpe and Koenig, P.C.

(57) ABSTRACT

An apparatus is provided for lightening of thin, flexible and shaped workpieces by removal machining of material from surfaces thereof, on a machining unit having a worktable and a counterthrust member which rests against a part of the surface of the workpiece opposed to the one on which said tool must work from time to time. The worktable includes a support member of the workpiece to be machined, and gripping mechanism which supports the workpiece during its machining independently of the support mechanism. The counterthrust mechanism includes a board movable according to several axes and carrying a plurality of supporting elements. The supporting elements can be individually translated or in groups between a draw-in position and an extended position to define a supporting plane depending on the shape of the surface of the workpiece against which the counterthrust mechanism rests. A method is also provided for mapping the workpiece surface.

26 Claims, 9 Drawing Sheets

(51) Int. Cl.
  *G05B 19/18* (2006.01)
  *B23Q 1/76* (2006.01)
  *B25B 5/00* (2006.01)
  *B25H 1/00* (2006.01)

(52) U.S. Cl.
  CPC ........... *G05B 19/18* (2013.01); *G05B 19/401* (2013.01); *B23Q 2240/005* (2013.01); *B25B 5/00* (2013.01); *B25H 1/00* (2013.01)

(56) References Cited

U.S. PATENT DOCUMENTS

| | | |
|---|---|---|
| 7,168,898 B2 | 1/2007 | Hamann |
| 7,507,059 B2 | 3/2009 | Hamann |
| 2009/0140482 A1 | 6/2009 | Saberton et al. |

FOREIGN PATENT DOCUMENTS

| | | |
|---|---|---|
| EP | 1564135 A1 | 8/2005 |
| EP | 1569058 A1 | 8/2005 |
| ES | 2026410 A6 | 4/1992 |

\* cited by examiner

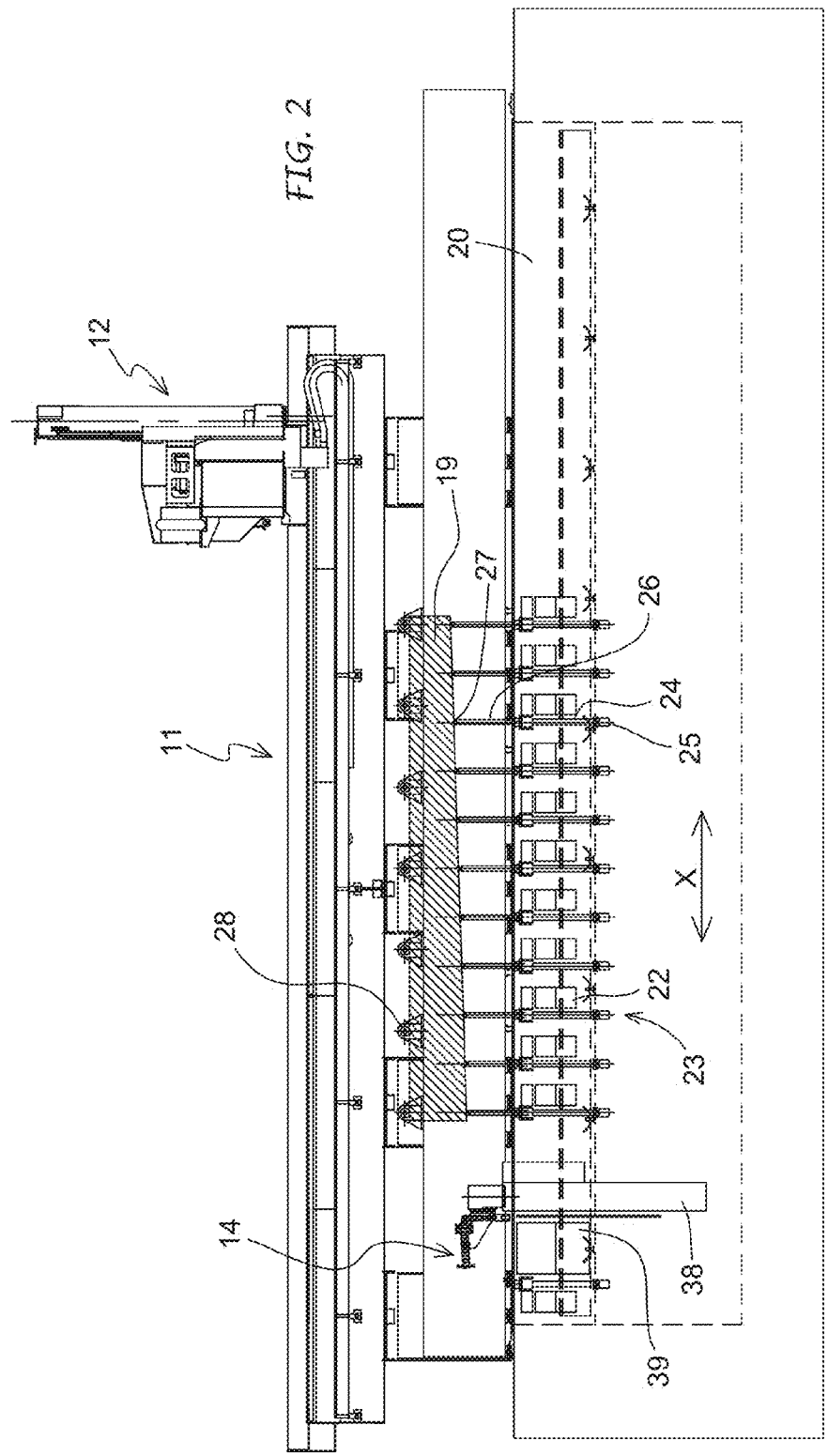

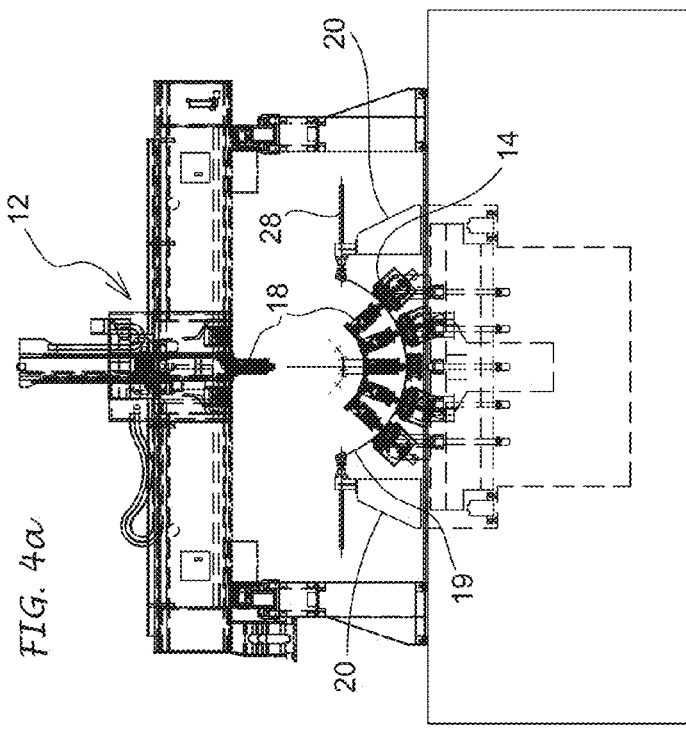
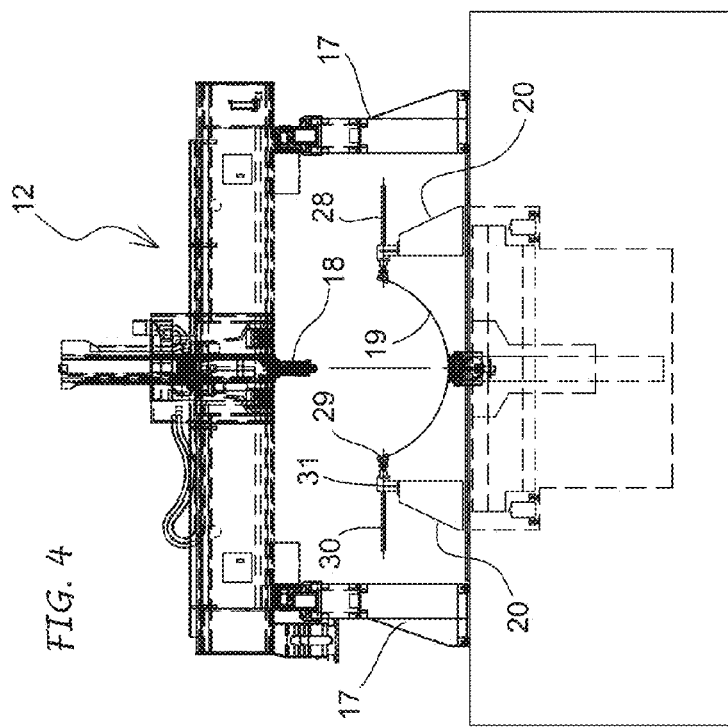

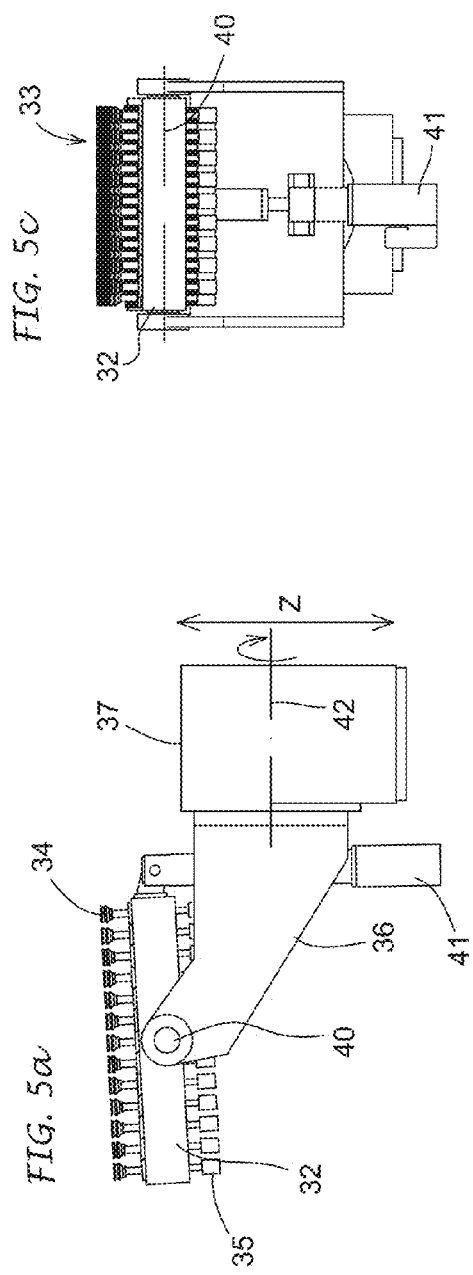
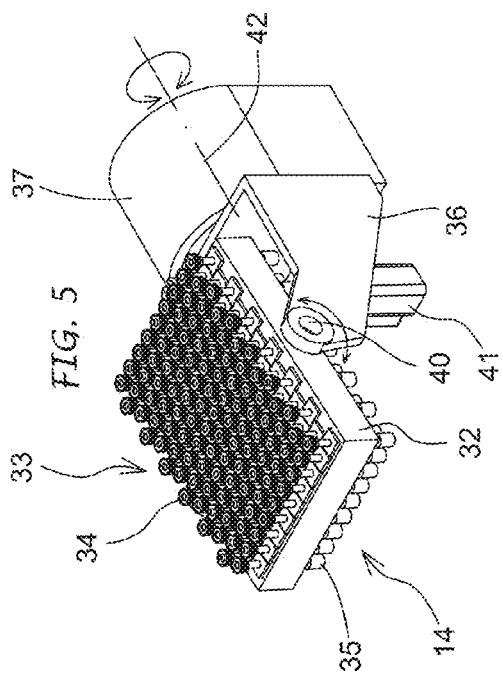
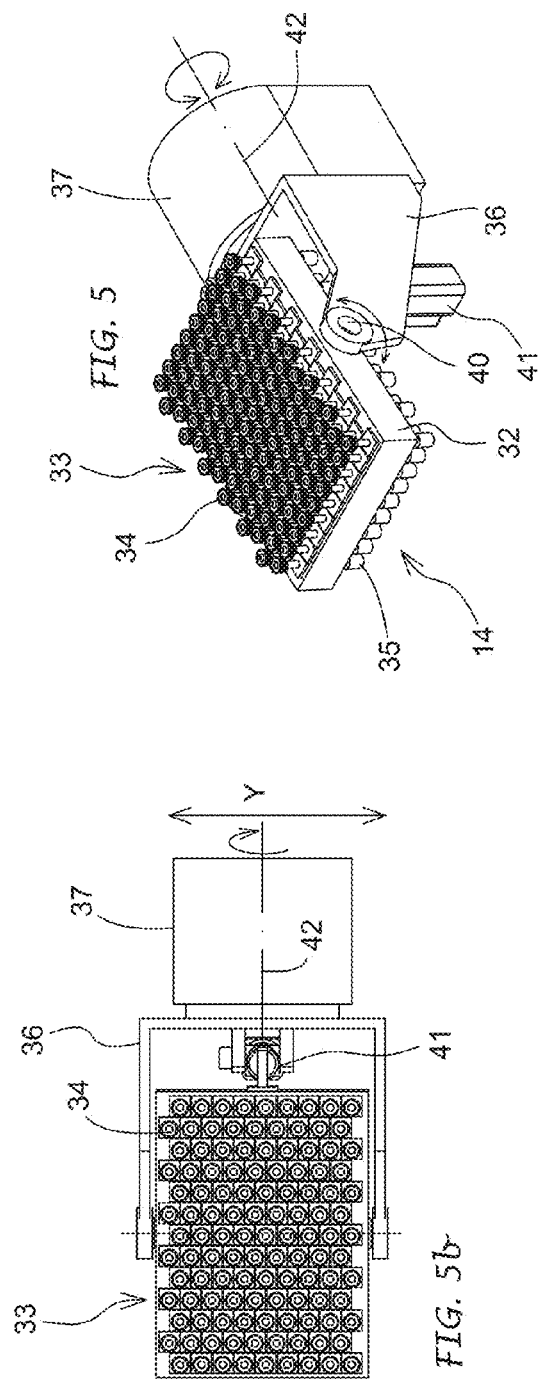

APPARATUS FOR THE LIGHTENING OF PANELS OR THIN PLATES BY REMOVAL OF MATERIAL

FIELD OF THE INVENTION

The present invention concerns an apparatus for removal machining of material from thin, flexible and shaped items, such as panels, plates or sheet metals made of light alloys of aluminum, titanium, or metallic compounds or based on organic resins.

STATE OF THE ART

In some industry fields, for example in the aeronautical field in the fuselage coating, metallic panels having thin thicknesses, in the order of a few millimeters, and also variously shaped and curved, are required and used, on which, after their pre-forming, operations aimed at obtaining pockets or pits, countersinks or simply a reduction in thickness for a lightening must be made, where it can be done, without affecting the resistance thereof.

According to the known art, such operations could be carried out by an etching process, also defined as chemical milling. This process is carried out with a preventive masking, by a protective film called "maskant", of the panel surfaces, then clearing only the area to be treated, for leaving them uncovered. Afterwards, the panel are dipped in, or sprayed with a solution able to convert the metal in a metallic salt, which is subsequently removed by a continuous renewal of the reacting solution. However this process entails various operations and drawbacks. In fact the panel must be subjected to a preliminary cleaning. Then they must be covered with a protective film with the care of cutting and removing film portions where the chemical milling has to be carried out. After the chemical treatment, panels must be washed at least for removing the remaining masking film. Areas with different depths cannot be realized with only one operation anymore; the used reacting solutions could become sources of wastes to be treated and the washing fluids have to be treated too.

With the aim to overcome the drawbacks of the process of chemical milling, the machining of thin and flexible panels of the afore said type has been also proposed by localized removal of material through milling, drilling tools or similar. Each panel is then supported on a respective fixed or movable support so that the part of its side to be machined could be accessed with a tool carried by at least one operating head of a machine tool which may have different layout. But in this case the tool thrust would tend to unduly deform the thin and flexible panel and to not be able to control directly the pass depth in the working area from time to time. Hence the problem of counterbalancing the tool thrust on the workpiece arose, problem tried to be solved by the use of a collation element to be rested on the opposite side of the panel at the working area, that is in front of the tool operating on the other side.

Documents U.S. Pat. No. 5,121,907, WO 2005/046931 and EP 1564135B1, for example, are indicative of the background art concerning this. Particularly, the first of these documents describes only a revolving table for rearranging a flat plate into a curved/shaped plate and supporting it during the machining, but without disclosing nor suggesting how the operations are carried out. Other documents relate to the processing methods of sheet materials which include mainly the use of an individual supporting element substantially spherical or hemispherical with a counterthrust head. This, however, defines a supporting surface of the workplace essentially point-shaped and however roughly equivalent in size to the thrust surface of the tool and that, when the workpiece is curved, rests only tangentially on the area to be sustained. Therefore the supporting element, for being constantly in front of the tool and its supporting action for being effective, it must continuously follow the tool movements, so much so that the tool and supporting element must be controlled and moved in synchronism and their axes must coincide with each other. In other words, the supporting element is functionally and cinematically constrained to the tool because it has to follow every movement of the latter and the distance between the tool and the supporting element has to be measured continuously during the work.

OBJECT OF THE INVENTION

The present invention aims for solving the afore mentioned problem and eliminating the drawbacks referred to above and rendering more flexible and effective the removal machining of material of panels or thin, flexible and shaped plates (hereinafter called simply workpiece or workpieces) for use, e.g., in the manufacture of commercial aircrafts.

Another object of the present invention is to maximize the quality of manufacturing obtainable through a mathematical modeling of the workpieces.

Therefore, in its first aspect, the present invention concerns an apparatus for the lightening by removal machining of material of thin, flexible and shaped workpieces, such as panels, plates or sheet metals, comprising a mobile portal machining unit, provided with at least one tool, a fixed worktable or movable with respect to the machining unit to receive and support a pre-shaped workpiece to be machined, and a counterthrust means designed to rest against a part of the surface of the workpiece opposed to the one on which said tool works, wherein the worktable comprises means supporting the workpiece with respect to the machining unit, and wherein
the counterthrust means consist of a board carrying a plurality of supporting elements facing towards the workpiece to be machined, and
the board is movable according to several axes and said supporting elements are movable independently of each other between a position, called passive position, proximal to said board, and a distal position with respect to said board, called active position, to define a supporting plane substantially complementary to the shape of the workpiece surface against which the counterthrust means has to rest.

Preferably, each supporting element is associated with a corresponding pneumatic actuator controlling the movement with respect to the board.

The herein proposed apparatus makes significant improvements and advantages with respect to the known art. In fact it allows, in general, to optimize the work space, limiting it to not much more than the maximum dimensions of the workpiece to be machined, to decrease the area to be preserved clean from swarfs, furthermore aiding the evacuation thereof and reducing the times of working cycles.

Preferably the worktable is stationary and includes two shoulders parallel at variable distance and, in relation to said shoulders, supporting means designed to constitute a variable configuration plane for a transitory support of the workpiece to be machined, and gripping means designed to grip at least the workpiece sides and to support it during its machining independently from said supporting means.

Alternatively the worktable can be translated at least in the resting plane of the workpiece to be machined, or in parallel to a handling plane of the machining unit. Also with this configuration the worktable has supporting means and independent gripping means of the workpiece to be machined.

In general, then, the worktable, because of the its configuration, allows a single placing of the workpiece during the whole working cycle, and therefore less need for workpiece handling, absence of release and taking back of the workpiece during the work cycle, lower risk of working errors and also possibilities of performing supplementary processes such as drilling or other in the lightening step. In addition, and advantageously, the worktable is adjustable for its adaptation to workpieces of different sizes and shapes and with it the workpiece is always and firmly in the same horizontal position for all working operations.

Concerning the supporting and counterthrust board, it has the advantages of:
- being able to adapt to every layout of the surface of the workpiece to be machined, also before interacting with the workpiece itself, according to a controlling program taking account of the shape of such a surface,
- providing a large rest surface for better supporting the workpiece and countering the thrust of the workpiece,
- being functionally released from the tool, so that to be able to stand still while the tool carries out the operation in progress, and also
- allowing the working operations with the tool in several workpiece portions at the area rested to the same counterthrust board,
- being able to adjust and manage the pass depth as well as the tool movements depending on the operation to be carried out from time to time.

The apparatus and the working cycle of every workpiece could be programmed and managed with numerical control units.

Preferably the counterthrust means comprise, for every supporting element of the board, a corresponding sensor detecting the travel. For example, for every supporting element an encoder is associated, the latter detecting the travel completed by the supporting element for displacing in abutment against the surface of the workpiece to be machined.

Preferably the supporting elements can be translated with respect to the board in any position between the afore said proximal (passive) and distal (active) positions, in practice any position between a retracted position and an extended position, which corresponds to the abutment against the workpiece surface in normal operation.

More preferably every supporting element comprises its own pneumatic actuator which, when activated, causes the translation with respect to the board.

Preferably the travel of the supporting elements is measured by respective encoders generating electric signals corresponding to the travel detected value. The electrical signals generated by the encoders are collected and processed by a special controlling unit of the apparatus; the processing is used to map the surface of the workpiece, that is to define a mathematical model of the workpiece surface, as obtained from the acquisition of the coordinates of its points.

Advantageously the mapping of the workpiece surface can be obtained aside from the lightening operations. In other words, the board can be operated with the tool or also alone to obtain only the mapping of the workpiece surface. Therefore the board can be operated independently by the user for mapping the whole or part of the workpiece surface disposed on the worktable.

Once the workpiece surface has been mapped, completely or partially, the processed mathematical model is used to optimize the subsequent manufacturing process of the workpiece surface opposite to the mapped surface. For example, the mapped surface is the lower surface of a metal plate and the manufacturing process is a milling of the corresponding upper surface of the plate. The mathematical model may be adopted as the model of the real shape of the workpiece.

In its second aspect, independent from the first and for which the Applicant reserves the right to file a divisional application, the present invention concerns a method according to claim 24, for mapping the surface of a workpiece in an apparatus for machining surfaces of thin, flexible and shaped workpieces, such as panels, plates or sheet metals.

Particularly the method comprises the steps of:
a) arranging a apparatus comprising
 - a mobile portal, machining unit, provided with at least one tool, a fixed worktable or movable with respect to the machining unit, designed to support a workpiece to be machined, and a counterthrust means designed to rest against a part of the surface of the workpiece opposed to the one on which said tool works, wherein
 - the counterthrust means consist of a board, movable along at least two axes, carrying a plurality of supporting elements facing towards the workpiece to be machined, and wherein
 - said supporting elements are movable independently of each other between a position, called passive position, proximal to said board, and a distal position with respect to said board, called active position, and
b) positioning said board at a corresponding portion of the workpiece to be mapped;
c) moving one or more of said supporting elements with respect to the board and displacing them in abutment against the surface of the workpiece;
d) detecting the travel run by each of said supporting elements to get in abutment against the surface of the workpiece;
e) based on the detection of the step d) calculating coordinates of each surface point of the workpiece against which a supporting element was displaced in abutment; and
f) repeating the steps b)-e) for mapping one or more surface portion of the workpiece, or its whole surface.

With the expression "mapping" it is intended to detect the point coordinates of the workpiece surface with respect to a reference frame. Such a detection allows to define a mathematical model of the workpiece surface, for example a tridimensional model usable to optimize the machining on the workpiece itself, for example a subsequent milling of the workpiece surface opposed to the mapped surface.

Once the mathematical model of a portion of the workpiece surface has been defined, such a model is used to optimize the subsequent machining of the opposed surface of the workpiece, for example to mill such a surface. In other words, the apparatus board is used to map a portion of the workpiece surface, for example the outer surface, and in an immediately following step, to support the tool in the working operations provided on the opposite surface, the inner one.

In practice the apparatus operates in feedback based on the mathematical model defined through the mapping. Possible localized deformations of the workpiece disposed on the worktable—the deformations caused, for example, by flexions, torsions, thermal expansions, etc.—are balanced. The controlling unit of the apparatus can be programmed to consider the mathematical model as an indication of the real surface of the workpiece at that moment and it is then adopted as a reference for processes that are implemented on the surface opposite to the mapped surface. In this way processing errors are avoided, for example a too much deep milling of the surface opposite to the mapped one is avoided.

Therefore the method according to the invention is highly useful for optimizing the qualities of the processes possible with the afore described apparatus.

Preferably the travel of every supporting element is detected by a corresponding sensor, for example an encoder generating a signal collected by the controller. Signals are processed by the controller as afore described to calculate the coordinates of the step e) of the method and define the afore said mathematical model.

In practice the supporting elements are used, if needed, also as tracers on the workpiece surface. This use is independent from, and it comes before, the use for counterbalancing the workpiece thrust. Preferably the board can be operated to carry out the surface mapping immediately before an workpiece machining step at the opposite surface.

In practice, the travel detection of the supporting elements allows to define at least one coordinate, for example along a Z axis orthogonal to the board, of corresponding points on the workpiece surface; the position of the board compared to the worktable and with respect to the vertical line is identified by the remaining coordinates, for example X, Y. Ultimately the method allows to process a matrix of X, Y, Z coordinates of the points of the workpiece surface probed by the supporting elements.

The person skilled of the art will understand that the mapping of the workpiece surface the more exact is the greater the number of probed points is.

As described, the supporting elements can be operated independently one from another, but preferably they are operated in predefined groups. For example the supporting elements are disposed according to a grid and they are operated in parallel and/or orthogonal rows, otherwise in groups of adjoining supporting elements, etc.

In an embodiment of the method according to the invention, the definition of the mathematical model of the workpiece surface may anyway provide the interpolation of the detected coordinates; in this way de number of points to be probed to obtain the model is minimized.

BRIEF DESCRIPTION OF THE DRAWINGS

On the other hand the invention will be illustrated in more detail in the description course made with reference, by way of example only and without limitation, to the attached drawings, in which:

FIG. 2 shows a side view of the apparatus in FIG. 1a in the positioning step of an workpiece on the worktable;

FIG. 4 shows a view of the vertical plane F-F in FIG. 3;

FIG. 4a shows a view similar to FIG. 4, but with the tool and the counterthrust board in different operative positions;

FIG. 5 shows a perspective view of the counterthrust board only;

FIGS. 5a, 5b and 5c show, respectively, the side, top and front views of the counterthrust board in FIG. 5;

DETAILED DESCRIPTION OF THE INVENTION

Figure 1:
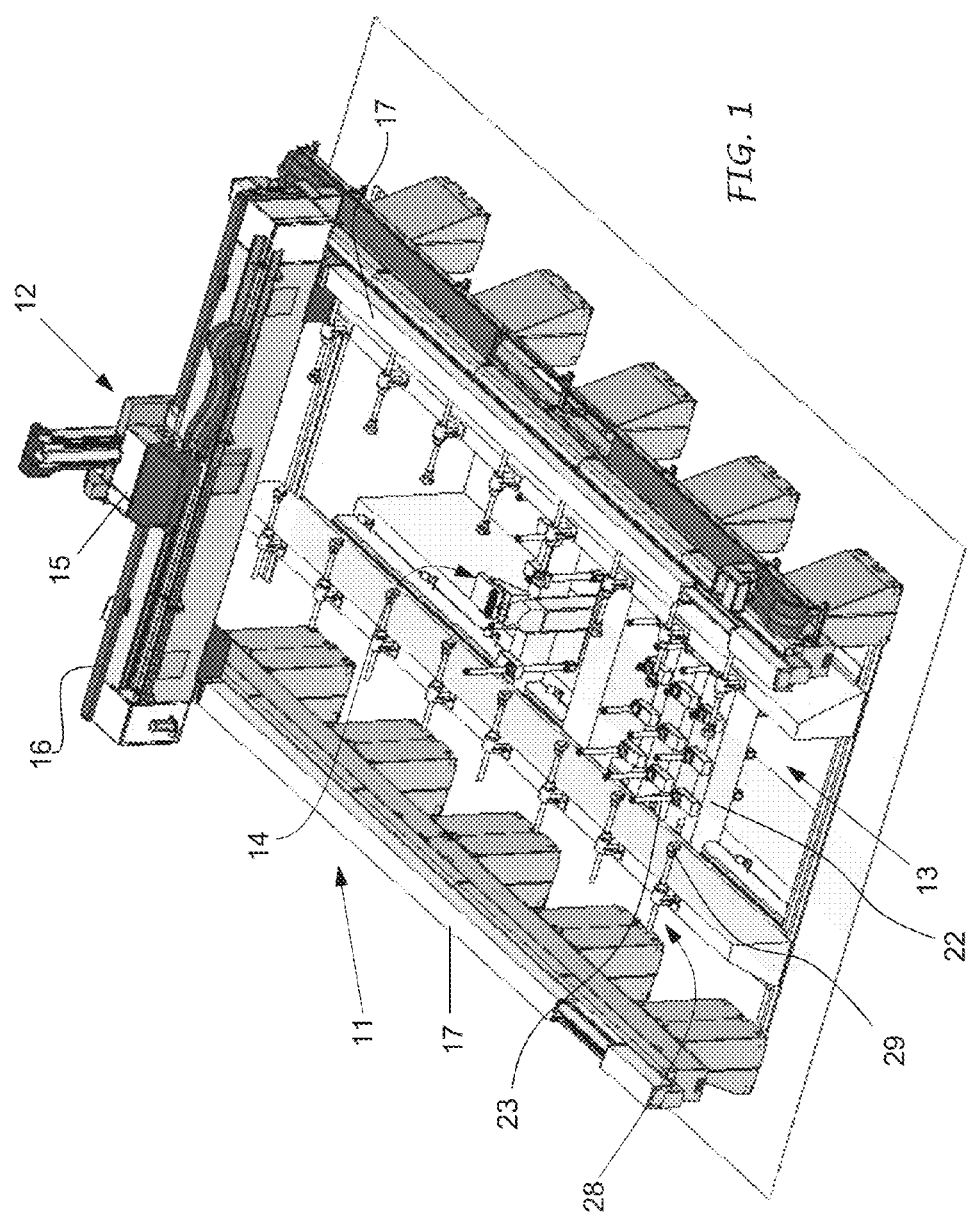
FIG. 1 shows schematically an axonometric view of a apparatus according to the present invention.

The apparatus according to the invention is generically indicated in FIG. 1 with the numeral reference 11 and it comprises essentially a numerically controlled machining unit 12, a worktable 13 and counterthrust means or board 14.

Particularly the machining unit 12 may be of the type having a multi-axes operating head 15, assembled on a supporting bridged structure 16 movable along rails 17 and carrying at least one tool 18 for mechanical operations to be carried out on thin, flexible and also preventively curved workpieces 19, for example, but not exclusively, in the shape of panels intended for covering the aircraft. fuselage.

In the embodiment shown in figures, the worktable 13 is stationary. The worktable 13 is disposed between the rails 17 of the machining unit 12, preferably in a stationary position. It comprises two side shoulders 20, parallel one to another and to the rails 17, as well as at a variable distance one from another according to a Y axis (FIG. 1a) both supported by transversal guides 21 and conveniently driven. Between the two side shoulders 20 crossbeams or beds 22 are transversally assembled, both carrying at least one row of supporting means 23. These beds 22 are driven and can be individually translated or in groups, parallel one to another, so that to be able to be approached and distanced mutually according to an X axis (FIG. 1a) based on the workpiece to be machined.

The supporting means 23 on each bed 22 are all in a vertical arrangement. Each of the consists of an actuator 24 provided with a servomotor 25 for controlling a stem 26 which can be extended in height and which carries on its top a head with a suction cup 27 adjustable in all directions and connected at least to a vacuum source. Further said supporting means 23 may be fixed on the respective bed 22, but preferably they are driven and movable selectively along the bed 22 itself according to she Y axis.

Overall, the supporting means 23 properly selected, activated and placed in different positions in height will concur in providing a bed or supporting surface having variable arrangement, corresponding to longitudinal and transversal shape of the workpiece 19 that is from time to time temporarily resting.

On the side shoulders 20 of the worktable gripping means 28 oriented in the Y axis direction are assembled, with the gripping means on a shoulder facing those on the other side shoulder.

Particularly, the gripping means 28 each comprise a clamp 29 assembled at the end of a rod 30 positioned on board of a support 31 associated with a respective side shoulder 20. In case the supports 31 of the gripping means 28 may be movable and they could be positioned along the side shoulders 20 according to the X axis, but the rods 30 carrying the clamps 29 are anyway movable and positionable according to the Y axis relatively to the side shoulders 20 and each clamps 29 will be articulated and adjustable in every direction. Further, the gripping means 28 may be activated selectively and positioned based on the geometry of the workpiece to be machined so as to:

grip at least the longitudinal side edges of the workpiece 19 to be machined when the latter is rested on the supporting means 23 of the worktable 13, hold the shape of the workpiece and sustain it firmly without the supporting means during its machining, and release the workpiece on the supporting means at the end of the machining to be done by the machining unit.

Alternatively the worktable 13 is movable with respect to the floor and/or the machining unit 12 according to known methods.

Figure 3:
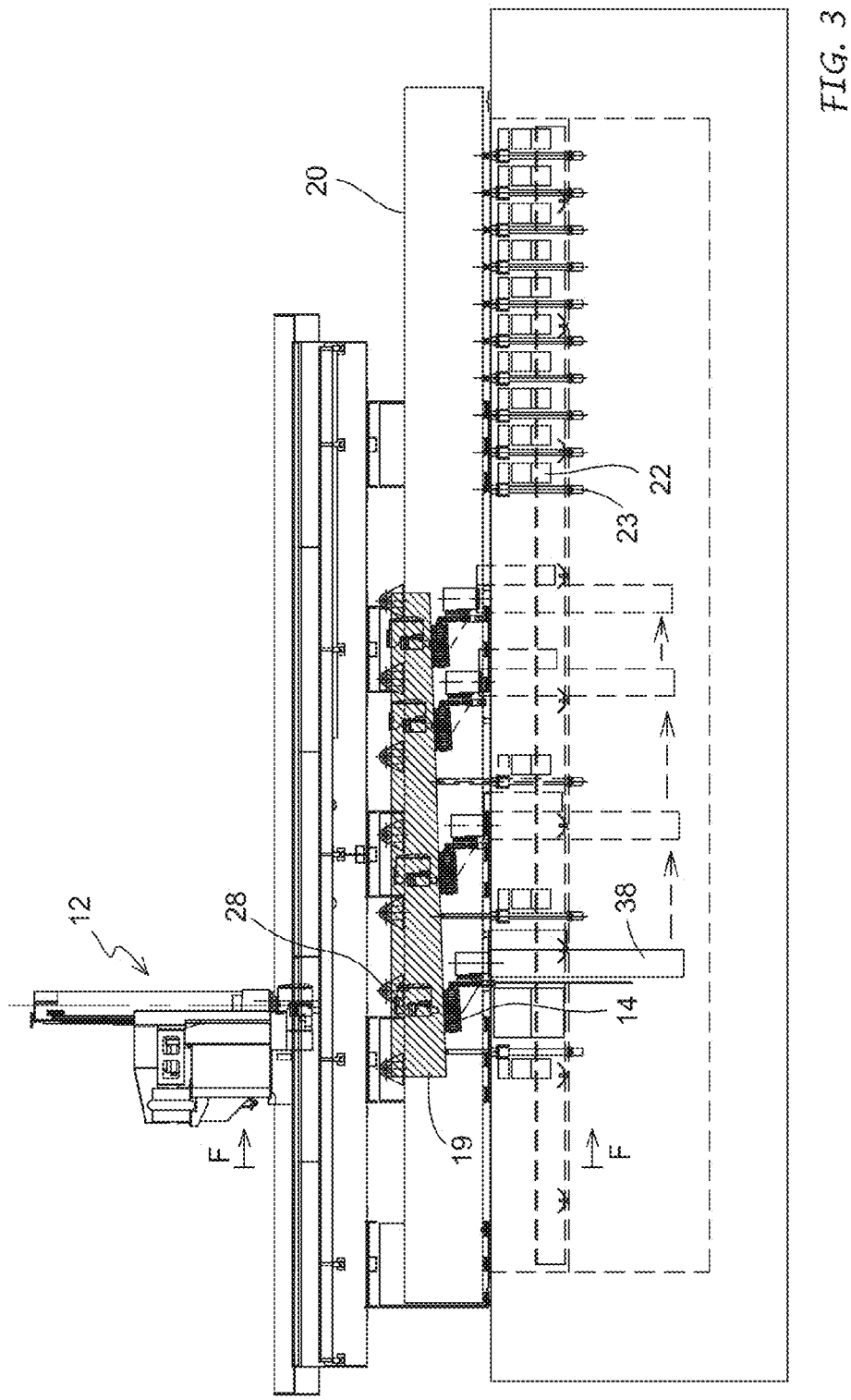
FIG. 3 shows a apparatus view similar to that in FIG. 2, but with the workpiece in the working position grasped by side clamps and with the counterthrust board in different positions.

The counterthrust board 14 is assembled and movable. between the shoulders 20 of the worktable 13, preferably interposed between the beds 22, with at least one bed at one side and the remaining beds 22 at the opposite part of the bed itself (FIGS. 1-3).

The operations to be carried out by the apparatus of the invention are usually directed to locally obtain pockets, pits, countersinks, etc. and/or reductions in thickness of at least one face of the workpiece 19 with a tool 18 of the machining center 12, which tool will exert thrust with at least one orthogonal component in the machining area, thrust that, as mentioned above, requires a counter-balance to avoid deformations of the workpiece.

The counterthrust board 14 is intended for accomplishing such a function, resting and adapting to the workpiece surface opposite to that the tool is working on, from time no time at the machining area. When the tool will work on the part of the concave surface, the counterthrust board 14 will rest at the part of the convex surface of the workpiece, as shown in the drawings, and vice versa.

Particularly, the counterthrust board 14 (FIG. 5) comprises a flat body 32, substantially quadrilateral, having limited dimensions with respect to the surface of the workpiece 19, but anyway greater than the workpiece dimensions. Such a body 32 carries an organized plurality of supporting elements 33 raising from its surface facing towards the workpiece 19. Every supporting element 33 may be provided with a head 34 intended for resting on the workpiece 19, the head being able to be suction cup-shaped 34, as in the example shown in the drawings, or any other shape, but it is arranged to oscillate in every direction to be able to adapt to the surface of the workpiece itself.

In an embodiment of the present invention, particularly adapted for the implementation of the claimed method, the head 34 of the supporting elements 33 is a tracer.

Figure 6A:
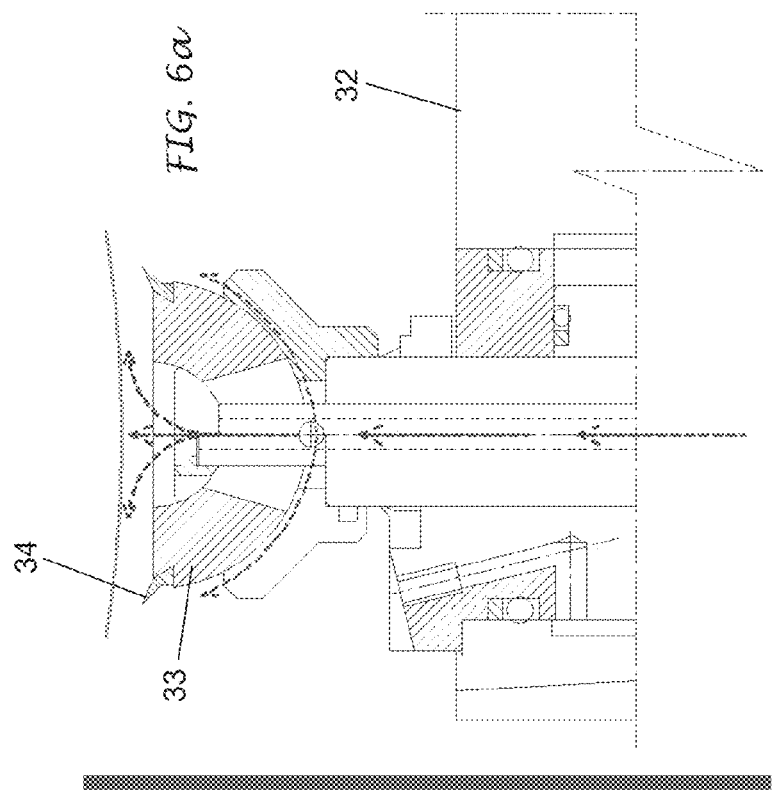
FIG. 6a shows an expanded view of the framed portion in FIG. 6.
Figure 6:
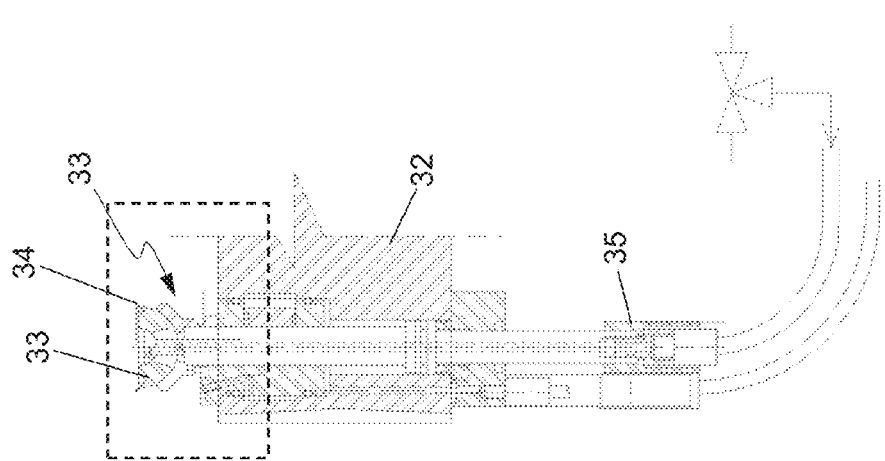
FIG. 6 shows a vertical section of a supporting element on the worktable.

In addition, every supporting element 33 (FIGS. 6, 6a) has its own actuator 35 for its axial movement towards and away from the workpiece at different extent depending on the shape of the surface it has to rest on and it may be provided with a brake or another blocking apparatus to stabilize the selected position.

Preferably the actuator 35 is of a pneumatic type; alternatively the actuator 35 is oleodyhamic or magnetic.

The body 32 carrying the supporting elements 33 of the board 14 is applied to a support 36 in its turn associated with a slide 37 that is movable in height along a post 38 (FIGS. 2 and 3) placed on board of the horizontal crossbeam 39 assembled between the shoulders 20 of the worktable 13.

More precisely the body 32 is assembled on the respective support 36 by a first horizontal oscillation axis 40 and it is connected to an apparatus 41 for driving and controlling its oscillations on such an axis. The support 36 is associated with the slide 37 through a second horizontal oscillation axis 42 orthogonal to the first axis 40. The slide 37 is connected to the actuating means—not Represented—for its movements in height along the post 38 on a Z axis. This post 38 is driven, controlled and can be displaced, by convenient means, along the crossbeam 39 oriented on the Y axis of the worktable 13. And the crossbeam 39 is in its turn driven, controlled and can be displaced on the Y axis of the worktable 13.

Therefore the counterthrust board 14 has a number of degrees of freedom: in fact it is oscillating both on the first axis 40 and on the second axis 42, and it is susceptible to move linearly on the above defined X, Y, and Z axes, in addition to carry the supporting elements 33 each having its own head or suction cup 34, the latter being susceptible of oscillations too.

The movements and position of beds 22, supporting means 23 and worktable 13, as well as of the counterthrust board 14 and in case of the supporting elements 33 are programmed and managed selectively from time to time based on the shapes and parts of the workpiece and/or the surface to be supported and according to the machining to be carried out on the workpiece by the machining unit 12.

For their part, the supporting elements 33 on the counterthrust board 14 may be arranged in groups and selectively activated in order to avoid the use of those supporting elements that could be found out from the surface of the workpiece to be machined, if the latter is smaller than the board surface or because of reasons due to special workpiece curvatures.

Preferably to every supporting element 33 a pressure gauge 33 and a corresponding controlling circuit (not shown) are associated with. When the head 34 of a supporting element is displaced in abutment against the surface of the workpiece 19, a depressor inside the head 34 is generated and it is immediately detected by the respective controlling circuit. In this case the actuator 35 is deactivated, that is the thrust of the supporting element 33 towards the workpiece 19 is stopped. In this way the thrust generation on the workpiece 19 by a supporting element 33 is avoided, that could cause an undesirable localized deformation of the workpiece 19 itself.

Then, preferably, all the supporting elements 33 may be driven and managed so as to complete ideally the whole travel between the passive and active positions, and so they do stop as soon as they strike against the outer surface of the workpiece 19 to be machined with respective suction cups, however, before completing the whole travel.

Then the supporting elements 33 could auto-adapt because their suction cup-shaped heads 34 fit from time to time their position automatically to the shape of the workpiece surface. In other words, after the placement of the counterthrust board 14 in a substantially perpendicular position and adjacent to the workpiece surface opposite to the surface to be machined, the supporting elements 33 receive the impulse to carry out their whole travel but stopping before completing it as soon as they impact with the suction cup-shaped head 34 against the surface to "acquire".

Alternatively, the supporting elements 33 may be already arranged in a fully extended position during the approach step of the counterthrust board 14 to the workpiece, that is before the suction cup-shaped heads 34 impact the workpiece surface opposite the surface to be machined. In this case the self-adaptation is achieved thanks to the fact that the supporting elements, or their rest heads 34, are adapted to the workpiece surface through the juxtaposition of the board, of course when the board distance from the workpiece surface is less than the fully extended elevation of the actuator of each element 33. In practice, as soon as the heads 34 of the supporting elements 33 are supported against the workpiece surface, their actuators 35 retract partially because of squashout, standardizing from time to time the head position to the shape of the workpiece surface.

In a different embodiment, the supporting elements 33 on the counterthrust board 14 may be equipped with pre-configured travel and managed so as to form with the respective rest heads 34 a "pre-shaped" bed depending on the workpiece geometry even before the board, or as soon as the latter rests on the workpiece itself.

Figure 1A:
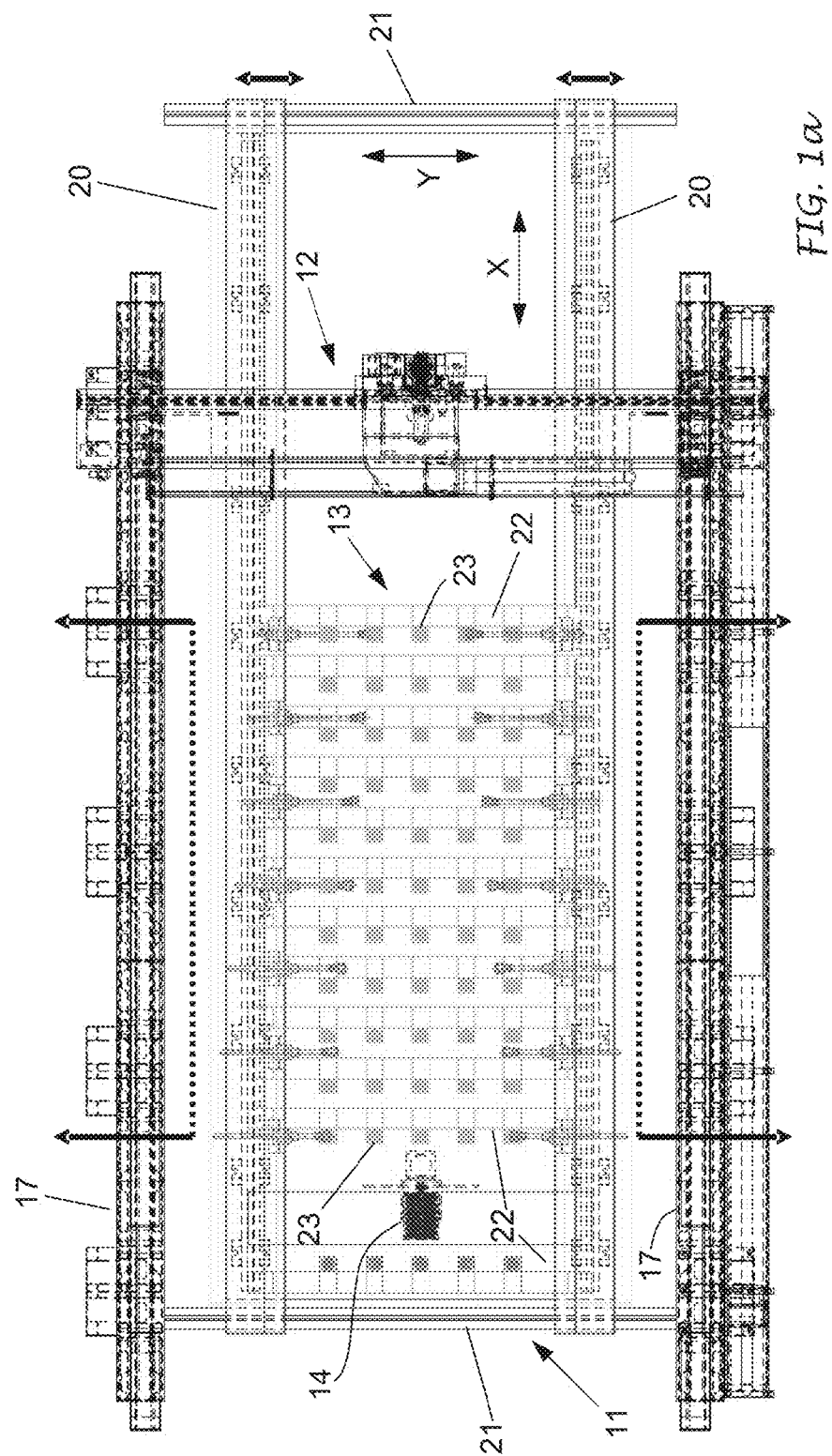
FIG. 1a shows a top view of the apparatus in FIG. 1.

When the apparatus is in resting state, the operating head 15 of the machining unit is parked, for example, at the end of the worktable 13 and the counterthrust board 14 at the other end—FIGS. 1, 1a. Then, before starting a working cycle of a pre-shaped workpiece 19, the distance between the shoulders 20 of the worktable could be adjusted in accordance with the dimensions of the workpiece 19, the gripping means 28 are withdrawn in an inactive position and the beds 22 with the respective supporting means 23 are automatically managed and positioned to form together a bed or supporting plane configured to receive the workpiece. This is then arranged on the supporting means 23—FIG. 2—with the possible aid of reference means for its orientation. Afterwards the clamps 29 of the gripping means 28 are firstly moved near the workpiece 19 acting, for example manually, on the respective rods 30 and after they are activated to fasten the longitudinal workpiece edges. The supporting means 23 are the deactivated and moved away from the workpiece so that the latter is supported only by the side clamps. The beds 22 with the respective supporting elements 23 are then moved in a separated position, out of any interference with the workpiece working area, in case leaving one of them active with the function of "holding" the shape of the workpiece (FIG. 3).

At that point, the counterthrust board 14 is placed under the workpiece (next to the possible bed again active) by adjusting the height and orienting it according to the geometry of the workpiece itself, in the immediate vicinity of its surface opposite to the area to be lightened, after that the supporting elements 33, firstly retracted, are activated up to adhere to the workpiece surface at to the surface to be machined, but opposite to it, that is to say in front of the tool that will execute the operation.

In this case a mapping of a surface portion of the workpiece is carried out and the definition of a corresponding mathematical model.

The mathematical model is used by the controller of the apparatus 11 to activate the tool 18. In this case the board is not repositioned, but it is on standby for applying the counterthrust with respect to the tool 18. Obviously the stem of the supporting elements is blocked by a breaking or blocking apparatus for stabilizing the position and not withdrawing under the tool thrust.

Figure 7:
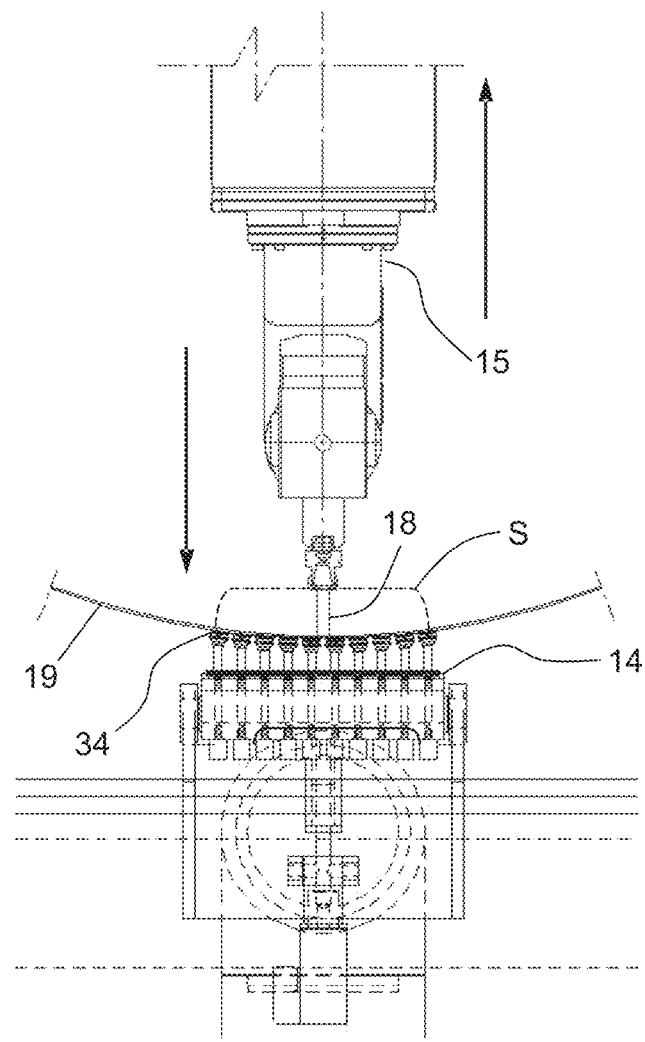
FIG. 7 shows a position of the counterthrust board with respect to the working tool and the area in which the tool may work with respect to the board.

The workpiece is then disposed and supported for carrying out the first operations with the tool 18 on board of the operating head 15 of the machining unit 12 at the counterthrust board 14, inside the rest area of the latter, indicated with S in FIG. 7. After these first operations, the tool is brought in a rest position, the counterthrust board 14 is deactivated, then moved and activated again based on programs to rest and adapt to the surface in a new working area of the workpiece—FIG. 3—where other machining with the tool could be carried out. And so on for further pre-established machining in different workpiece areas. In case the board is activated for carrying out a mapping of the surface of the workpiece 19 opposite to the surface to be machined.

Therefore, and as afore said, the counterthrust board 14 adopts and holds the same position during the machining by the tool, and for each its repositioning it is movable independently from the operative movements of the tool.

Furthermore, with a convenient management of the supporting means 23 and the gripping means 28 of the workpiece and the counterthrust board 23, further supplementary and additional machining of the workpiece could be carried out.

Figure 8:
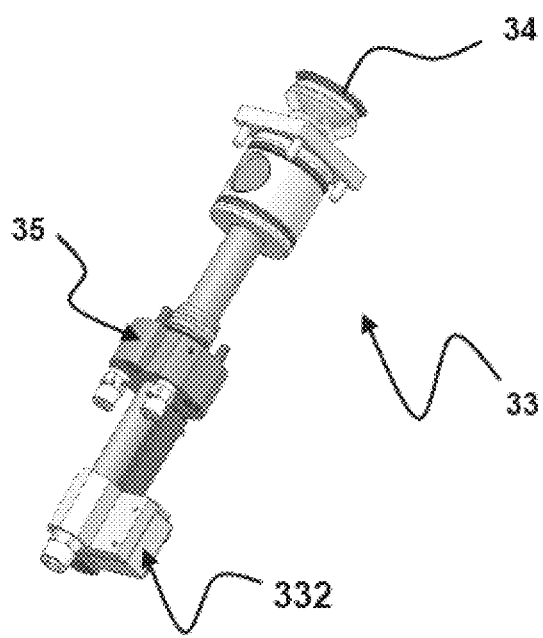
FIG. 8 is a perspective view of a detail of the apparatus shown in FIG. 1.

FIG. 8 shows in perspective view a single supporting element 33. The head 34 and the actuator 35 accommodated in the element 33 itself are visible.

In its second aspect the present invention concerns a method for mapping the surface of the workpiece 19, that is a method for detecting the space coordinates of points of the workpiece surface.

Particularly, the method provides for using the supporting elements 33 as they are tracers able to detect the position of a corresponding point on the surface of the workpiece 19 with respect to a reference frame of die apparatus.

This is obtained by providing each supporting element 33 with a corresponding sensor 332 for detecting the travel of the element 33 itself. For example the sensor 332 is an optical, or magnetic, capacitive encoder, etc.

In practice the encoder 332 detects the travel made by the respective supporting element 33 for displacing in abutment against the workpiece surface, for example with an adjustable head 34, translating with respect to the board 14. Signal generated by the encoders of every supporting activated element 33 are collected and processed by the controller for extrapolating the coordinates of the probed or traced points. In this way the profile of the workpiece 19 is mathematically defined in three dimensions.

The method provides that the supporting elements 33 may be activated independently one from another. In practice the controller acquires a coordinate matrix of each point of the workpiece 19 probed by a supporting element 33.

The supporting elements 33 may be activated simultaneously or in different times one from another. Further the supporting elements 33 may also be activated individually or in predefined groups, for example rows, sectors, etc.

The mathematical model of the profile of the workpiece 19 can be used to maximize the quality of the subsequent working operations by the apparatus 11 on the workpiece 19 at the workpiece surface opposite to the mapped surface, or to immediately detect the mismatch of the workpiece 19 with respect to certain dimensional requirements to be able to immediately reject the workpiece 19 not repairable, before making unnecessary working operations. For example, the used model to maximize the milling quality of an upper surface of the workpiece 19.

The invention claimed is:

1. An apparatus for the lightening of thin, flexible and shaped workpieces by removal machining of material from surfaces thereof, comprising:
   a mobile portal machining unit provided with at least one tool,
   a fixed worktable or movable with respect to the machining unit to receive and support a pre-shaped workpiece to be machined, and
   a counterthrust member configured to rest against a part of a surface of the workpiece opposed to a surface on which said tool works,
   the worktable comprises:

at least one supporting mechanism, configured to constitute a bed or a variable configuration plane for a transitory support of the workpiece to be machined, and gripping mechanism configured to support the workpiece during its machining independently from said at least one supporting mechanism, and the counterthrust member comprises a board carrying a plurality of supporting elements facing towards the workpiece to be machined, wherein said board is movable according to several axes and said supporting elements can be operated individually or in groups between a proximal position with respect to the board and a distal position with respect to the board to define a supporting plane conforming to the shape of the surface of the workpiece against which the counterthrust member must rest.

2. Apparatus according to claim 1, wherein the worktable further comprises two parallel lateral shoulders able to be positioned at a variable distance and cooperating with said at least one supporting mechanism, and said gripping mechanism is configured to clamp at least the longitudinal sides of the workpiece and to support the workpiece during its machining independently from said at least one supporting mechanism.

3. Apparatus according to claim 1, wherein the worktable is fixed in regard to the machining unit and the counterthrust board is movable with respect to the worktable.

4. Apparatus according to claim 2, wherein said at least one supporting mechanism is on board of beds mounted between the lateral shoulders of the worktable, wherein said gripping mechanism are associated with said lateral shoulders facing towards the longitudinal axis of the worktable, each supporting member being vertical and with an adjustable height each bed of said bed is able to be translated in parallel with respect to each other according to the direction of the lateral shoulders, so as to be approached and distanced mutually depending on the workpiece to be machined.

5. Apparatus according to claim 4, wherein each supporting mechanism comprises an actuator with a control servomotor of a stem which can be extended in height and which carries a head with a suction cup adjustable in all directions and connected at least to a vacuum source.

6. Apparatus according to claim 5, wherein said supporting mechanism are fixed to a respective bed.

7. Apparatus according to claim 5, wherein said at least one supporting mechanism is controlled and movable selectively along the bed in a transversal direction with respect to the worktable along an axis defined between the lateral shoulders of the worktable.

8. Apparatus according to claim 2, wherein each gripping mechanism comprises a clamp mounted at the end of a rod carried by a support associated with a respective lateral shoulder of the worktable.

9. Apparatus according to claim 8, wherein the supports of the gripping mechanism are fixed to the lateral shoulders and the rods carrying the clamps are positionable in a transversal direction to the worktable along an axis defined between the lateral shoulders of the worktable.

10. Apparatus according to claim 8, wherein the supports of the gripping mechanism are movable along the lateral shoulders and the rods carrying the clamps are positionable in a transversal direction to the worktable along an axis defined between the lateral shoulders of the worktable.

11. Apparatus according to claim 8, wherein each clamp is articulated and can be adjustably orientated with respect to the respective rod.

12. Apparatus according to claim 1, wherein the counterthrust board is smaller than an entire surface of the workpiece, but the counterthrust board intercepts a larger area than an area intercepted instantly by the working tool.

13. Apparatus according to claim 1, wherein the counterthrust board is carried to a resting position against the workpiece while the tool is inoperative, and the counterthrust board is kept stationary in said resting position when the tool is working.

14. Apparatus according to claim 1, wherein the counterthrust board is movable with regards to the worktable according to three orthogonal linear axes and the counterthrust board is susceptible to oscillations / inclinations at least in two directions orthogonal one to another.

15. Apparatus according to claim 1, wherein the counterthrust board comprises a flat body carrying the plurality of supporting elements, wherein said supporting elements comprise a corresponding actuator and can be activated and moved with respect to said supporting plane, independently one from another, between the proximal and distal positions by means of said actuator.

16. Apparatus according to claim 15, wherein each supporting element is provided with a head configured to rest against the workpiece, said head being able to be oriented.

17. Apparatus according to claim 15, wherein the supporting elements on the counterthrust board are controlled to auto-adapt to the surface of the workpiece by travelling in abutment against the surface, said supporting elements being simultaneously movable between proximal and distal positions, with respect to the counterthrust board, at different extent depending on a shape of the surface of the workpiece the rest head must rest on, said actuator comprising a brake or blocking apparatus to stabilize the reached position.

18. Apparatus according to claim 16, wherein the supporting elements are controlled to auto-adjust to the surface of the workpiece, said elements being positioned in a same distal position, with respect to the counterthrust board, and moving back to different extent with respect to said distal position as soon as the supporting elements rest with corresponding head of each of said supporting elements against the surface of the workpiece, depending on the shape of the workpiece.

19. Apparatus according to claim 16, wherein each supporting element is movable between proximal and distal positions, with respect to the counterthrust board, at different extent depending on a shape of the surface of the workpiece the rest head must rest on, said actuator comprising a brake or blocking apparatus to stabilize the reached position.

20. Apparatus according to claim 1, wherein the counterthrust member comprises, for each supporting element, a sensor for detecting travel run by a respective supporting element for displacing in abutment against the surface of the workpiece.

21. Apparatus according to claim 20, wherein each sensor is an encoder generating a signal indicative of a position adopted by the respective supporting element.

22. Apparatus according to claim 21, comprising a controller programmed to acquire the signals generated by each encoder and to process said signals to define a mathematical model of the surface of the workpiece.

23. Apparatus according to claim 22, wherein said controller is programmed to run milling programs based on said mathematical model.

24. Method for mapping at least a portion of the surface of thin, flexible and shaped workpieces, such as panels, plates or sheet metals, the method comprising the steps of
a) arranging an apparatus comprising:

a mobile portal machining unit provided with at least one tool, a fixed worktable or movable with respect to the machining unit to receive and support a pre-shaped workpiece to be machined, and counterthrust means configured to rest against a part of a surface of the workpiece opposed to a surface on which said tool works, the worktable comprises:

a supporting mechanism, configured to constitute a bed or a variable configuration plane for a transitory support of the workpiece to be machined, and a gripping mechanism configured to support the workpiece during its machining independently from said supporting mechanism, and the counterthrust member comprises a board carrying a plurality of supporting elements facing towards the workpiece to be machined, wherein said board is movable according to several axes and said supporting elements can be operated individually or in groups between a proximal position with respect to the board and a distal position with respect to the board to define a supporting plane conforming to the shape of the surface of the workpiece against which the counterthrust member must rest and arranging the workpiece to be machined on the worktable of said apparatus; and b) positioning said board at a corresponding portion of the workpiece to be mapped;

c) moving one or more of said supporting elements with respect to the board and displacing said supporting elements in abutment against the surface of the workpiece;

d) detecting travel run by each of said supporting elements to displace in abutment against the surface of the workpiece;

e) calculating, based on the detection of the step d), the coordinates of each surface point of the workpiece against which a supporting element was displaced in abutment; and f) repeating steps b)-e) for mapping one or more surface portions of the workpiece, or whole surface of the workpiece.

25. Method according to the claim 24, further comprising the step of:

g) defining, based on at least one of said step e) or said step f), a mathematical tridimensional model of the surface of the workpiece.

26. Method according to the claim 25, comprising the step of:

h) activating the apparatus for carrying out machining of the workpiece based on said mathematical tridimensional model.

\* \* \* \* \*